United States Patent
Thibodeaux

(10) Patent No.: US 10,172,365 B2
(45) Date of Patent: Jan. 8, 2019

(54) NEGATIVE DRAFT INDUCING DEVICE FOR SMOKER

(71) Applicant: Stephen Thibodeaux, Baytown, TX (US)

(72) Inventor: Stephen Thibodeaux, Baytown, TX (US)

( * ) Notice: Subject to any disclaimer, the term of this patent is extended or adjusted under 35 U.S.C. 154(b) by 1071 days.

(21) Appl. No.: 14/322,348

(22) Filed: Jul. 2, 2014

(65) Prior Publication Data

US 2016/0000098 A1 Jan. 7, 2016

(51) Int. Cl.
A23B 4/052 (2006.01)

(52) U.S. Cl.
CPC .................... *A23B 4/052* (2013.01)

(58) Field of Classification Search
CPC ........ A47J 27/086; A47J 27/092; A47J 27/62; A47J 27/64; A47J 29/04; A47J 31/047; A47J 37/04; A47J 37/1228; A47J 42/44; A47J 9/006; A21C 13/00; A23L 3/3418; A23B 7/152; A23B 7/148; A23B 4/052; H05K 7/20; H05K 7/20009; H05K 7/20127; H05K 7/20136; H05K 7/20145; H05K 7/20154; H05K 7/20163; H05K 7/20172; H05K 7/20181; H05K 7/2019; H05K 7/202; H05K 7/20536; H05K 7/206; H05K 7/20609; H05K 7/20618; H05K 7/20636; H05K 7/20645; H05K 7/20654; H05K 7/207; H05K 7/20709; H05K 7/20836; H05K 7/20845; H05K 7/20854; H05K 7/20863; H05K 7/2089; H05K 7/209; H05K 7/20909; H05K 7/20918; H05K 7/20945; H05K 7/20954; H05K 7/20963; H05K 7/20972; H05K 9/0041; G06F 1/20; G06F 1/203; G06F 1/206
USPC ........... 99/467–482; 248/682, 467, 537, 200, 248/205.1–206.5, 309.4; 126/25 B, 15 R, 126/15 A, 25 R; 454/184, 185, 186, 904; 55/501, DIG. 6; 110/184, 327–330
See application file for complete search history.

(56) References Cited

U.S. PATENT DOCUMENTS

| | | | |
|---|---|---|---|
| 3,697,198 A | 10/1972 | Holder, Jr. | |
| 3,912,473 A * | 10/1975 | Wilkins | B01D 46/10 126/299 D |
| 3,933,145 A * | 1/1976 | Reich | A47J 37/0754 126/25 R |

(Continued)

*Primary Examiner* — Ibrahime A Abraham
*Assistant Examiner* — Gyounghyun Bae
(74) *Attorney, Agent, or Firm* — Vincent G. LoTempio; Kloss, Stenger & LoTempio; David T. Stephenson

(57) ABSTRACT

A negative draft inducing device for a smoker that induces a negative draft through an offset smoker. The negative draft is provided by means of a relatively small portable device which may readily be secured to the smoker when needed and readily released therefrom for storage when not in use. The device not only maintains a fire in the smoker, but also creates a negative flow of warm air through the smoker. The device includes a housing having an intake end and an output end. A fan inside the housing creates air flow from the intake end to the output rend. The housing attaches to a lower portion of the smoker, aligning with air registers. The air flow creates a negative draft across the smoker that maintains a fire in the lower portion and creates a uniform air flow over the smoked food and out the exhaust.

12 Claims, 9 Drawing Sheets

(56) References Cited

U.S. PATENT DOCUMENTS

| | | | | |
|---|---|---|---|---|
| 4,044,750 A | * | 8/1977 | Zeigler | F04D 29/526 126/25 B |
| 4,223,255 A | * | 9/1980 | Goldman | B60L 11/1805 310/77 |
| 4,788,905 A | * | 12/1988 | Von Kohorn | A47J 37/0781 126/25 R |
| 4,791,909 A | | 12/1988 | Kalthoff | |
| 4,934,260 A | * | 6/1990 | Blevins | A23B 4/052 126/21 A |
| 5,113,669 A | * | 5/1992 | Coffinberry | F02C 1/105 62/401 |
| 5,168,860 A | * | 12/1992 | Kibourian | A47J 37/0754 126/15 A |
| 5,554,902 A | * | 9/1996 | Kessens | H02K 1/16 310/156.12 |
| 5,689,403 A | * | 11/1997 | Robertson, Jr. | H04B 1/036 361/695 |
| 6,142,066 A | * | 11/2000 | Anders | A23B 4/052 99/386 |
| 6,201,217 B1 | * | 3/2001 | Moon | A47J 37/0623 126/21 A |
| 6,615,820 B1 | | 9/2003 | Ferreira et al. | |
| 7,331,759 B1 | * | 2/2008 | Tejeda | F04D 29/601 415/211.2 |
| 7,516,692 B2 | | 4/2009 | Pirkle et al. | |
| 8,218,319 B2 | * | 7/2012 | Wu | H01L 23/4093 165/121 |
| 8,944,148 B2 | * | 2/2015 | Hawwa | F28F 3/02 165/185 |
| 2001/0022334 A1 | * | 9/2001 | Iwata | A47B 21/0314 248/118 |
| 2005/0034716 A1 | * | 2/2005 | Harbin | A47J 37/01 126/25 R |
| 2006/0133036 A1 | * | 6/2006 | Durney | G06F 1/20 361/695 |
| 2006/0266064 A1 | * | 11/2006 | Rowatt | E21B 47/011 62/259.2 |
| 2007/0081888 A1 | * | 4/2007 | Harrison | F04D 19/007 415/47 |
| 2007/0292261 A1 | * | 12/2007 | Tang | F04D 25/08 415/119 |
| 2008/0048512 A1 | * | 2/2008 | Ito | H02K 11/21 310/71 |
| 2008/0227379 A1 | * | 9/2008 | Hung | F04D 29/601 454/184 |
| 2008/0239666 A1 | * | 10/2008 | Heller | H05K 7/20581 361/695 |
| 2009/0004348 A1 | * | 1/2009 | Silva | A23B 4/044 426/315 |
| 2009/0136638 A1 | * | 5/2009 | Fujie | A23B 4/044 426/314 |
| 2010/0162515 A1 | * | 7/2010 | Stephens | A47L 5/32 15/323 |
| 2010/0218754 A1 | * | 9/2010 | Kuntz | A47J 37/0786 126/25 R |
| 2013/0112187 A1 | * | 5/2013 | Cedar | F24B 1/182 126/15 A |
| 2013/0129544 A1 | * | 5/2013 | Liu | F04D 27/003 417/423.15 |
| 2014/0360387 A1 | * | 12/2014 | Bogdon | A23B 4/0523 99/476 |
| 2015/0079250 A1 | * | 3/2015 | Ahmed | A23B 4/052 426/314 |
| 2015/0264948 A1 | * | 9/2015 | Gridley | A47J 37/0623 99/481 |

* cited by examiner

NEGATIVE DRAFT INDUCING DEVICE FOR SMOKER

FIELD OF THE INVENTION

The present invention relates generally to a negative draft inducing device for a smoker. More so, the negative drat inducing device magnetically attaches to a smoker to blow air from a lower portion to an upper portion of the smoker, thus creating a negative draft through the smoker.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon.

By way of educational background, another aspect of the prior art generally useful to be aware of is that Smoking is the process of flavoring, cooking, or preserving food by exposing it to smoke from burning or smoldering material, most often wood. Meats and fish are the most common smoked foods, though cheeses, vegetables, and ingredients used to make beverages such as beer.

It is known that smoking may take several days at temperatures around 150 degrees to 200 degrees F. Aromatic woods, vines, or herbs may be used to impart various smoked flavors. The chemicals present in the smoke assist in the preservation of the food. However, for the smoke to fully integrate into the smoked food, the smoke must continuously flow past. Over smoking can lead to harmful accumulation of carcinogens on the food.

Typically, a uniform air flow through the smoker can create an excess of oxygen in the smoker, which improves the distribution of heat and produces a negative draft through from the lower portion to the upper portion of the smoker. Consequently, the negative draft creates more heat and less carbon dioxide throughout the cooking area. Furthermore, the negative draft forces the warmer air to rise through the upper exhaust from the cooking area, which further increases the flow of air through the smoker.

Often, a fan is used to generate air flow through a closed area, such as a room or chamber. The fan has rotatable fan blades that turn and push air in one direction, creating a downdraft and also capable of creating a cooling effect. Some fans come with an option to switch the blade function to updraft. This function reverses the pathway of airflow, creating an updraft. Either direction creates air flow. Inside of a smoker, the air flow is constantly in motion. In general, airflow tries to flow out of the smoker in the upper parts and make up air tries to flow into your house in the lower parts of the smoker.

Even though the above cited methods for a more efficient smoker address some of the needs of the market, a device that induces a negative draft across a firebox and cooking area of a smoker is still desired.

SUMMARY OF THE INVENTION

The present invention is directed to a negative draft inducing device that induces a negative draft through an offset smoker. The negative draft is provided by means of a relatively small portable device which may readily be secured to the smoker when needed and readily released therefrom for storage when not in use. The device not only maintains a fire in the smoker, but also creates a negative flow of warm air through the smoker. The resultant flow of warm air through the smoker cooks the meat more uniformly and efficiently by increasing the amount of oxygen, and creating a negative draft inside the smoker. Additionally, the device regulates and displays the temperature of the air flow. The device also attaches to air registers in the smoker through magnetic fasteners.

In one embodiment, the air flow generated by the device can create an excess of oxygen in the smoker, which improves the distribution of heat and produces a negative draft through from the lower portion to the upper portion of the smoker. Consequently, the negative draft creates more heat and less carbon dioxide throughout the cooking area. Furthermore, the subsequently generated negative draft forces the warmer air to rise through the upper exhaust from the cooking area, which further increases the flow of air through the smoker.

A general objective of the present invention is to establish a controlled clean burn with a negative draft of air flow throughout a smoker; thereby resulting in a cleaner tasting meat cooked in the smoker.

Another objective is to provide a negative draft inducing device that is compatible with a variety of smokers, grills, and various other cookers.

Still, another objective is to provide a portable draft inducing device that can couple to air registers on an offset firebox.

Still a further objective is to create a negative draft through a smoker with minimal energy consumption, and noise.

Yet another objective is to maintain a fire in a firebox.

Yet another objective is to reduce over smoking the meat, and thus inhibit the formation of polycyclic aromatic hydrocarbons in meats and other smoked foods.

Still another objective is to provide a variable speed fan in the device to regulate the flow of air in differently sized and dimensioned smokers.

Another objective is to provide a waterproof housing for the device.

Yet another objective is to enable the device to receive and convert electrical power from both AC and DC power sources.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 2A is a side view, FIG. 2B is a top view, and FIG. 2C is a bottom view, in accordance with an embodiment of the present invention;

FIG. 3A is a rear view of an exemplary intake end, and FIG. 3B is a frontal view of an exemplary output end, in accordance with an embodiment of the present invention;

FIG. 5A is an exemplary AC/DC adapter, and FIG. 5B is an exemplary power outlet, in accordance with an embodiment of the present invention;

FIG. 6A is an external view showing the positive and negative contacts, and FIG. 6B is a sectioned view showing an exemplary battery housed inside, in accordance with an embodiment of the present invention;

FIG. 7A shows a front view having an exemplary temperature indicia and switches, and FIG. 7B shows a rear view having exemplary temperature sensors and relay switches, in accordance with an embodiment of the present invention;

FIG. 8A is a top view, FIG. 8B is a detailed perspective view, and FIG. 8C is an elevated side view, in accordance with an embodiment of the present invention; FIG. 9A is a side view, and FIG. 9B is a detailed perspective view, in accordance with an embodiment of the present invention.

Like reference numerals refer to like parts throughout the various views of the drawings.

DETAILED DESCRIPTION OF THE INVENTION

Figure 1:
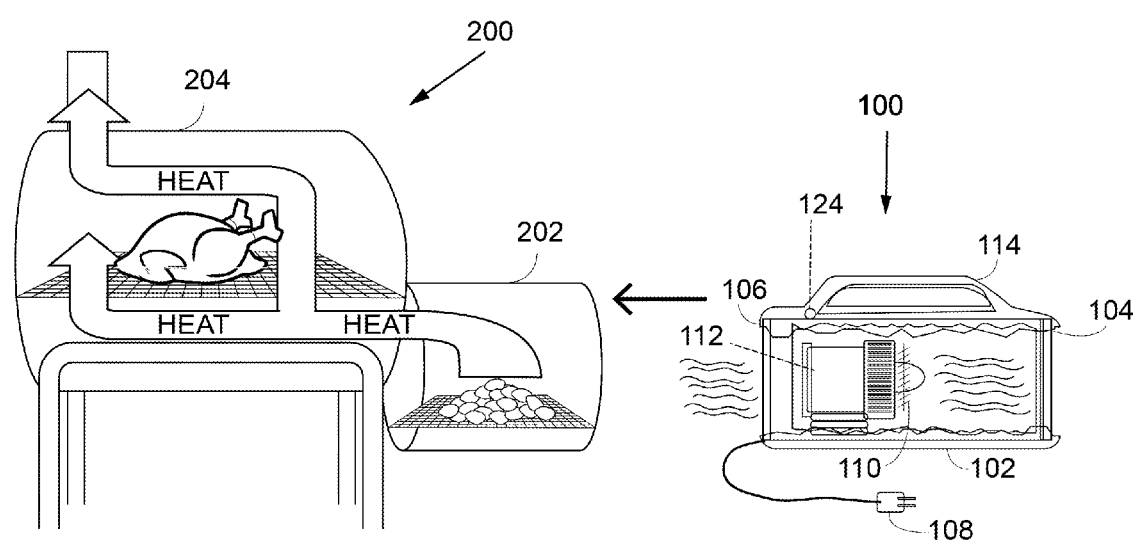
FIG. 1 illustrates a sectioned side view of an exemplary device attached to an exemplary smoker and inducing a negative draft inside the smoker, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

In one embodiment of the present invention presented in FIG. 1, a negative draft inducing device 100 creates a negative draft through a smoker 200 for maintaining a fire and uniform cooking throughout the smoker. A negative draft is provided by means of a relatively small portable negative draft inducing device 100 which may readily used in close association with or may be secured to the smoker 200 when needed and readily released therefrom for storage when not in use. Negative draft inducing device 100 not only maintains a fire in smoker 200, but also creates a flow of warm air through smoker 200. The resultant flow of warm air through smoker 200 cooks food more uniformly and efficiently by increasing the amount of oxygen, and creating a negative draft inside the smoker 200. Additionally, negative draft inducing device 100 regulates and displays the temperature of the air flow and atmosphere inside the smoker 200. Negative draft inducing device 100 preferably attaches to air registers in the smoker 200 through at least one magnetic fastener 126 (As shown in FIG. 3B).

The smoker may include an offset smoker 200 having a lower portion 202, such as a firebox for burning, and an upper portion 204 where the food cooks and the air flow releases. However, negative draft inducing device 100 may be utilized with various other smokers, including, without limitation, a grill, a slow cooker, and a smoke room. The negative draft inducing device 100 creates a negative draft across the entire longitudinal length of smoker 200, so as to encompass the fire and meat. Generally, the warmer air generated in a lower portion 202 of smoker 200 rises towards an exhaust in an upper region, and the air in the lower portion 202 quickly fills the vacuum left by the departing warm air, which induces a negative draft through the entire smoker 200. The present invention increases the negative draft by blowing air through the smoker 200 from the lower portion 202 to the upper portion 204. Specifically, the device 100 creates air flow that initiates from an offset firebox and flows through a cooking area of the smoker 200. The flow of air can then rise and exit the smoker 200 through an exhaust.

Those skilled in the art, in light of the present teachings, will recognize that the air flow generated by the device 100 can create an excess of oxygen in the smoker 200, which improves the distribution of heat and produces a negative draft through from the lower portion 202 to the upper portion 204 of the smoker 200. Consequently, the negative draft creates more heat and less carbon dioxide throughout the cooking area. Furthermore, the subsequently generated negative draft forces the warmer air to rise through the exhaust from the cooking area, which further increases the flow of air through the smoker 200. In some embodiments, the negative draft may be controlled by adjusting a stack damper on the discharge of the smoker 200, or setting a temperature range with a digital controller or rheostat.

Figure 2A:
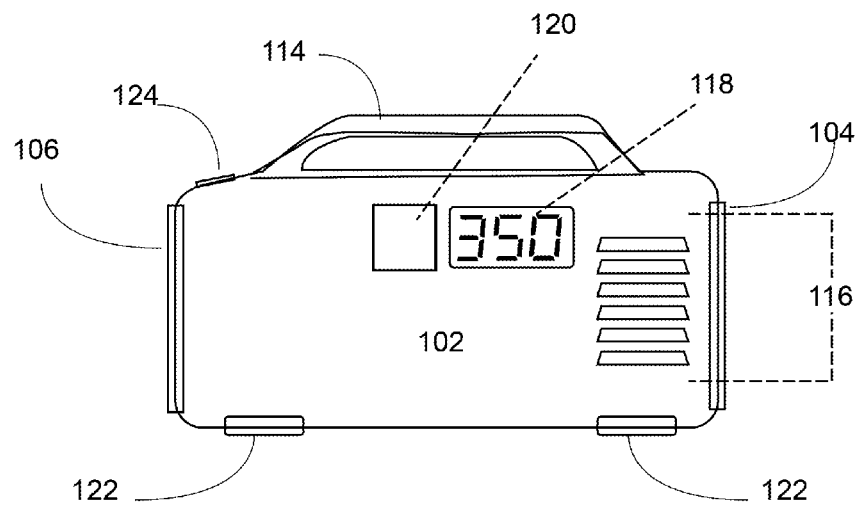
FIGS. 2A, 2B, and 2C illustrate various views of the device, where
Figures 2B, 2C:
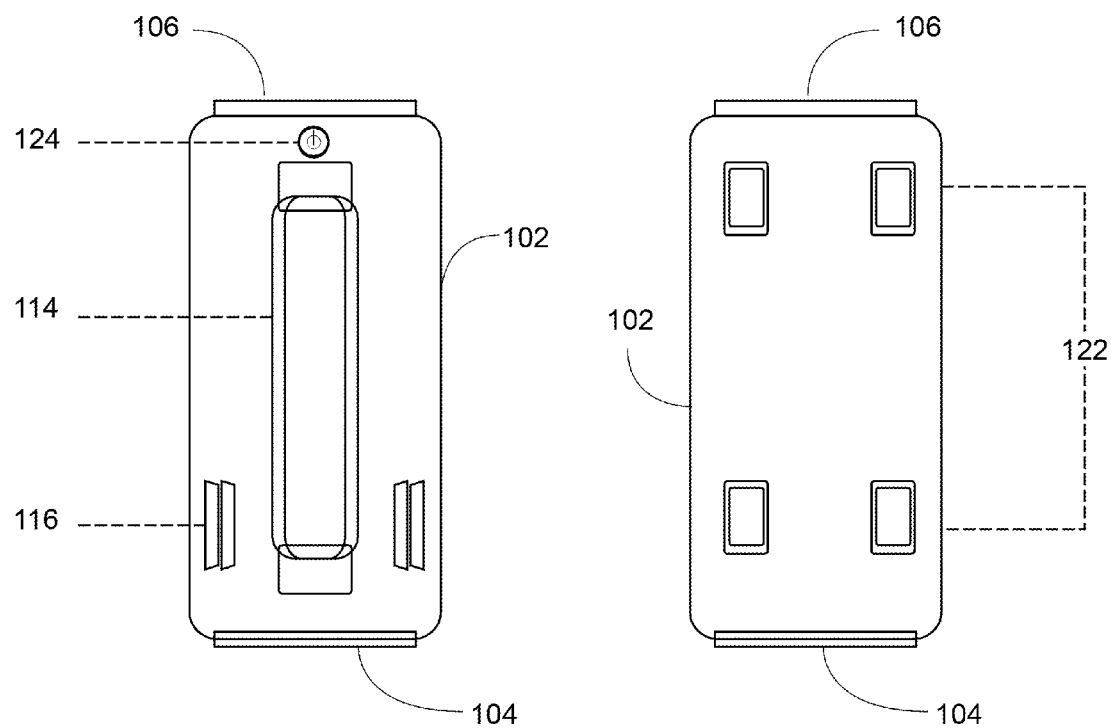

FIG. 1 illustrates the device 100 in close proximity to a smoker 200. The device 100 creates a negative draft through the smoker 200. The smoker 200 may include, without limitation, an offset smoker, a grill, and a slow cooker. The device 100 comprises a housing 102 configured to attach to a lower portion 202 of the smoker 200. The housing 102 may include a generally cylindrical shape. In some embodiments, the housing 102 may be corrosion resistant with a sealed motor shaft for moisture protection. FIG. 2A shows how the housing 102 having a plurality of vents 116 for improving circulation in the housing 102 and facilitating the air flow thereto. The vents 116 may include a number of grills arranged in parallel along a longitudinal side of the housing 102. The housing 102 is generally rigid and waterproof. This type of construction is effective for outdoor cooking. FIG. 2B is a top view, and FIG. 2C shows a bottom view of the housing, having at least one support member 122. The at least one support member 122 may include four feet that provide a base for the housing 102. However other types of support members 122 may be utilized, including feet that extend and retract from the housing 102 to create an adjustable height, and rolling wheels that enable additional portability.

Figure 3A:
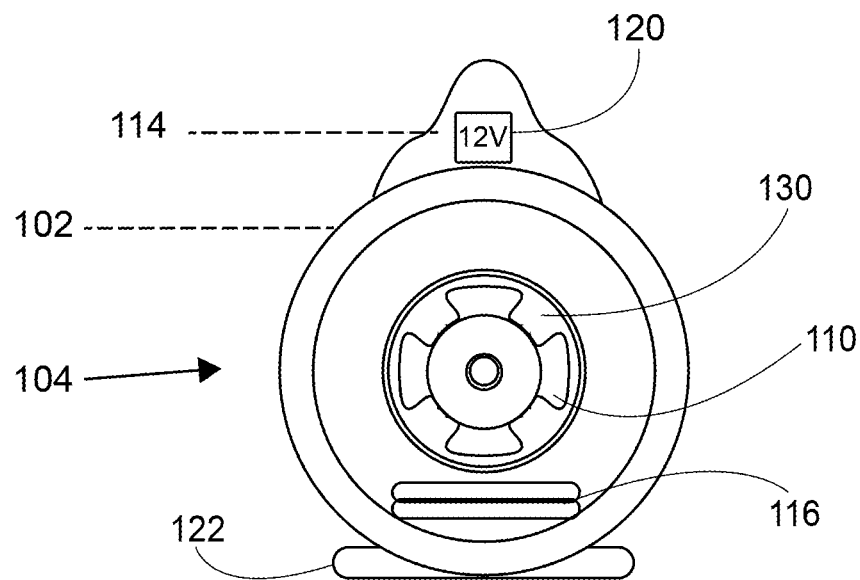
FIGS. 3A and 3B illustrate front and rear views of the device, where
Figure 3B:
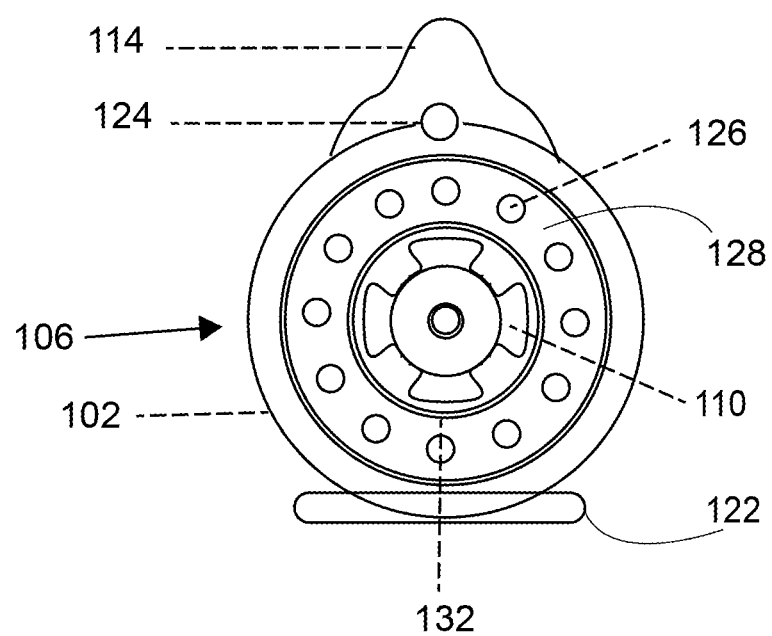

As referenced in FIGS. 3A and 3B, the housing 102 comprises an intake end 104 and an output end 106. FIG. 3A illustrates the intake end 104 having an intake opening 130 configured to enable an air flow into the housing 102. In one embodiment, the intake opening 130 may have a 5" diameter of a generally cylindrical shape. Additionally, FIG. 3B illustrates the output end 106 having an output opening 132 configured to enable the air flow out of the housing 102 and into the lower portion 202 of the smoker 200. In one embodiment, the output opening 132 may have a 5" diameter of a generally cylindrical shape. The output end 106 comprises a stabilizing plate 128 for positioning the at least one magnetic fastener 126 and regulating the direction of the air flow. The stabilizing plate 128 may include a perforated aluminum plate that fits over the output end 106. The stabilizing plate 128 has a hole that aligns with the output opening 132. In one embodiment, the stabilizing plate 128 comprises ten inserts used for fastening to the smoker 200.

The output end 106 further comprises at least one magnetic fastener 126 configured to fasten the housing 102 to an air register in the lower portion 202 of the smoker 200. In one embodiment, the at least one magnetic fastener 126 comprises ten samarium cobalt magnets that fit into the ten inserts of the stabilizing plate 128. However any number or material composition of magnets may be used. Those skilled in the art will recognize that metal smokers 200 can withstand high temperatures of smoking, and therefore, magnets provide a pragmatic fastening mechanism for the device 100.

Figure 4:
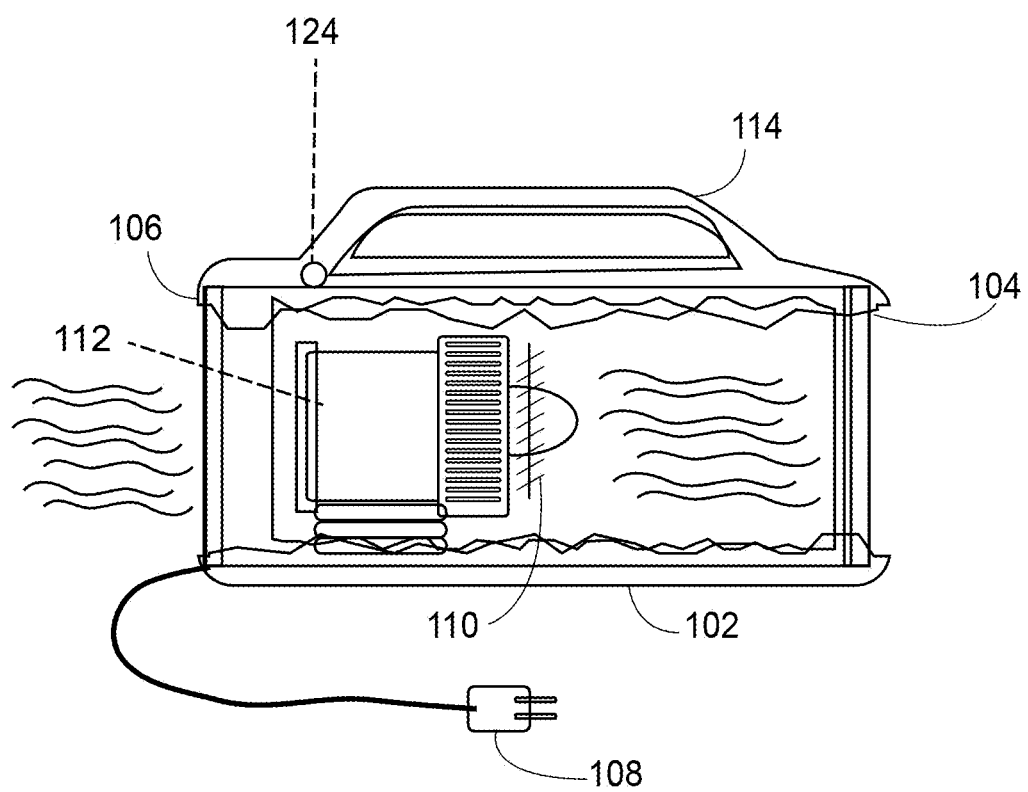
FIG. 4 illustrates a sectioned side view of the device, in accordance with an embodiment of the present invention.

FIG. 4 references a fan 110 arranged inside the housing 102. The fan 110 is configured to force the air flow from the intake end 104 to the output end 106. In one embodiment, the fan 110 comprises a 3" diameter that forces the air flow at 130 cubic feet per minute (cfm). However, any sized fan 110 that generates between fifty to one hundred thirty cfm may be used. The fan 110 pulls air from the intake opening 130 to the output opening 132 to create the air flow necessary for a negative draft through the smoker 200. The fan 110 comprises a fan motor 112 that rotates blades. The fan 110 has variable speeds to regulate the amount and speed of air flow through the smoker 200. This in turn creates adjustable negative draft to accommodate different smoked foods and sizes of smokers 200. In one embodiment, a power cord 108 extends between the fan motor 112 and an external power source, such as an AC socket, to carry electrical power.

Figure 5A:
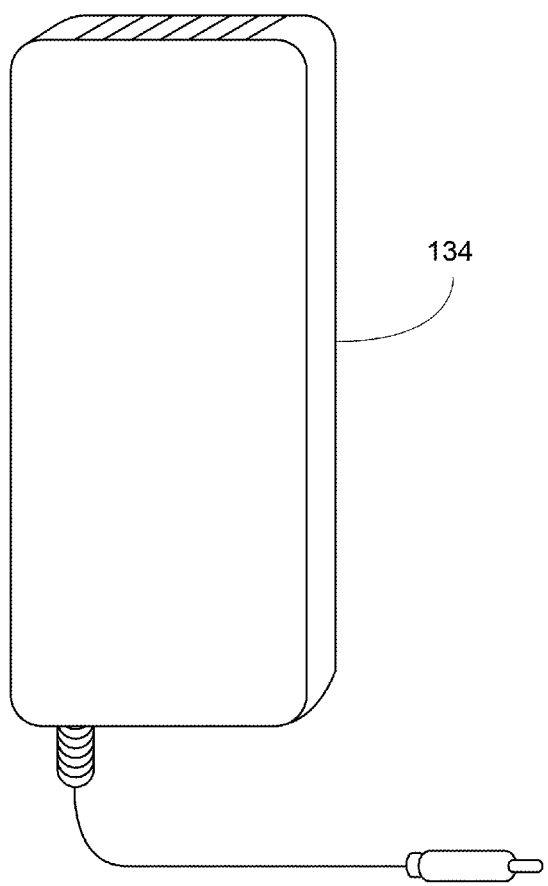
FIGS. 5A and 5B illustrate top views of an AC/DC power supply, where
Figure 5B:
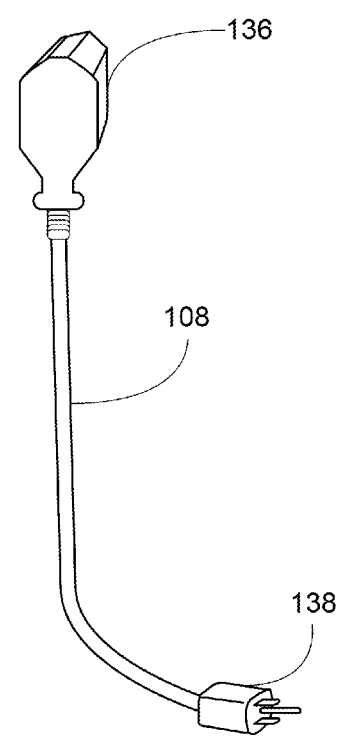
Figure 6A:
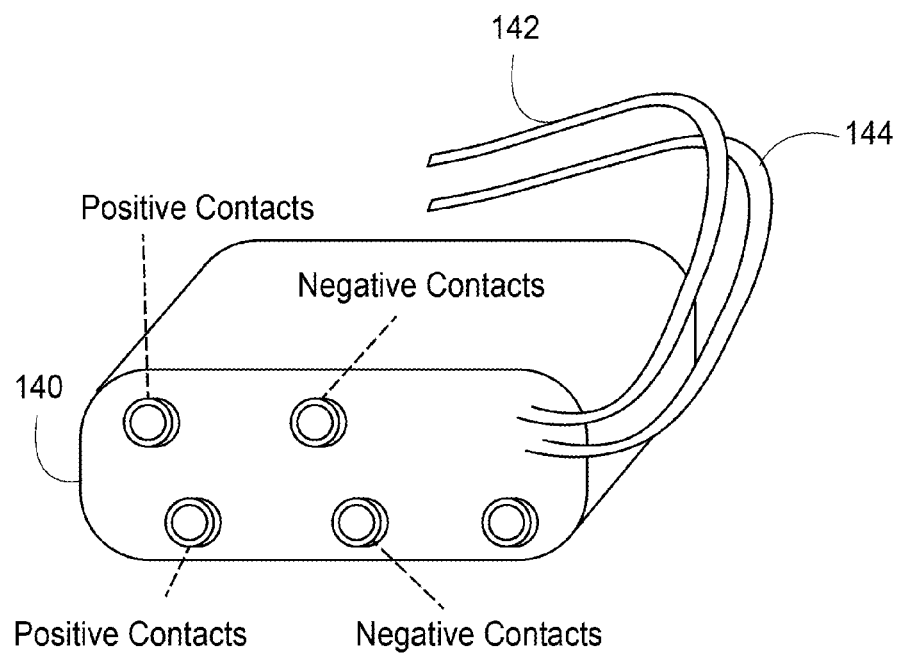
FIGS. 6A and 6B illustrate sectioned views of an exemplary DC power supply chamber, where
Figure 6B:
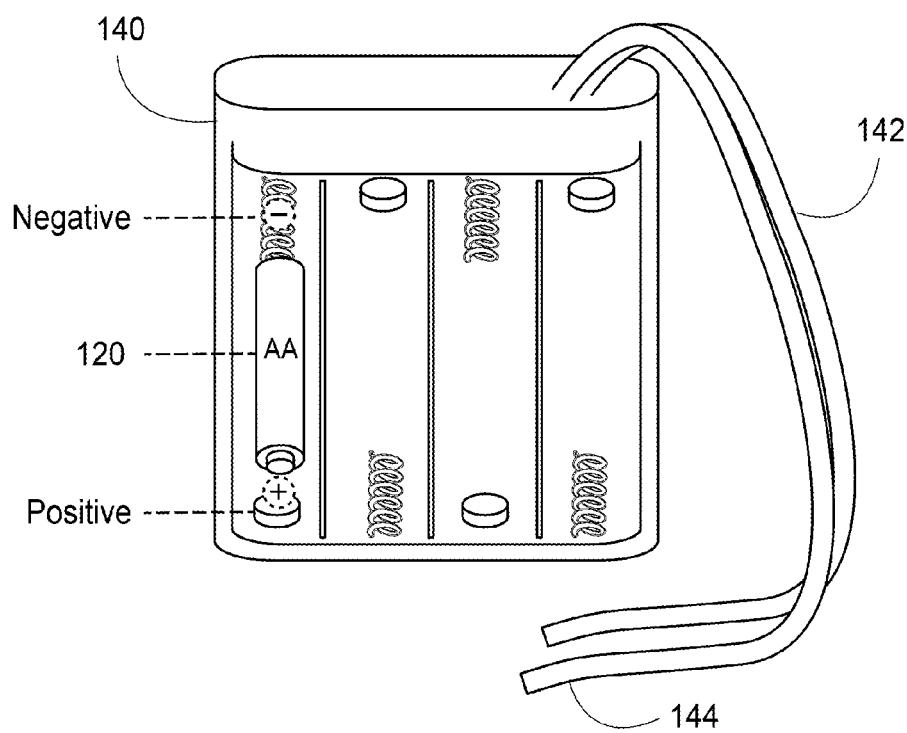

As referenced in FIGS. 5A and 5B the device 100 comprises an AC/DC adapter 134 configured to receive AC electrical power or DC electrical power from a power source for operating the fan motor 112. The AC/DC adapter 134 is a type of external power supply used to regulate the fan motor 112 and the temperature of the air flow. The AC/DC adapter 134 also allows the device 100 to utilize electrical power from an AC or a DC power source. Yet another electrical component used by the device 100 is illustrated in FIGS. 6A and 6B, which show the device 100 using a battery 120 for providing an alternative source of power to the device 100. The battery 120 may include, without limitation, a twelve volt battery, an AA battery, and a rechargeable battery. In one embodiment, the battery 120 is housed in a DC power supply chamber 140. A positive end of the battery 120 connects to a red positive lead 142, and a negative end of the battery 120 connects to a black negative lead 144 that extend from the DC power supply chamber 140. The leads 142, 144 operatively connect to the fan motor 112 and other electrical switches for operation of the device 100.

Figure 7A:
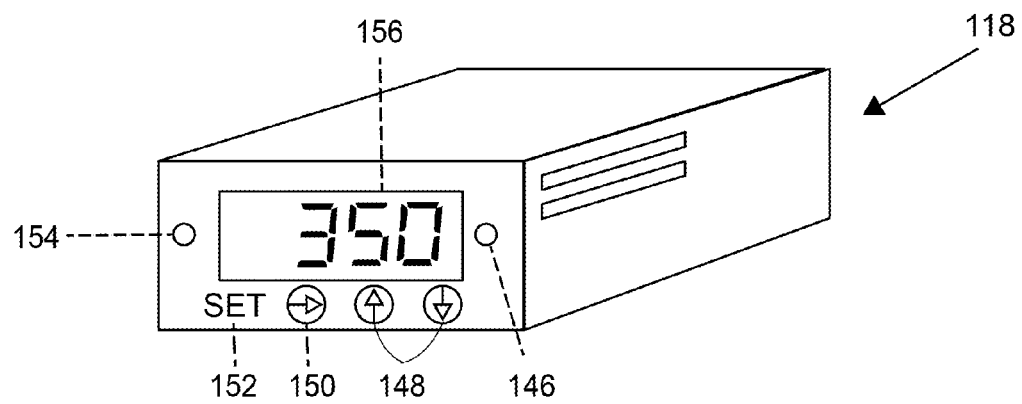
FIGS. 7A and 7B illustrate detailed perspective views of an exemplary display portion, where
Figure 7B:
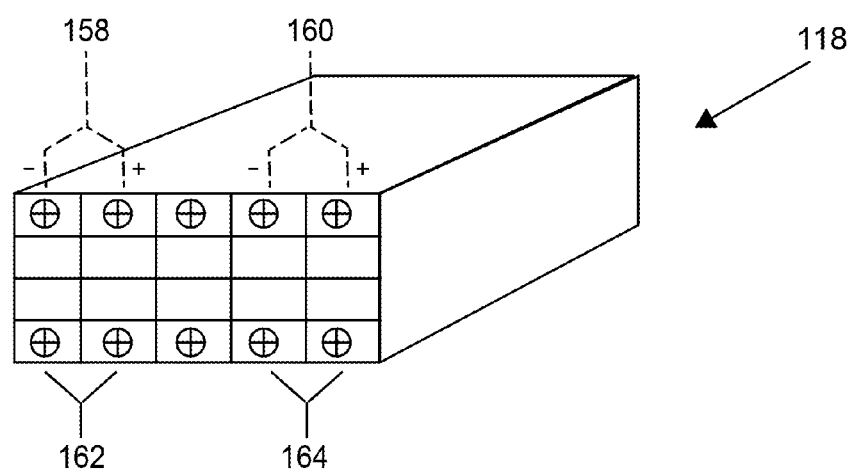

In FIGS. 7A and 7B, a display portion 118, visible form an external surface of the housing 102, displays the temperature and speed of the air flow. The display portion 118 may position on a side the housing 102. In one embodiment referenced in FIG. 7A, the display portion 118 comprises an alarm relay output indicator 146, a value increment switch 148, an auto tuning switch 150, a set/confirm/control/start switch 152, an auto tuning blinker 154, and a temperature indicia 156. The display portion 118 utilizes various sensors and electrical switches to regulate the temperature of the air flow. In one embodiment referenced in FIG. 7B, a temperature sensor 158 monitors the temperature to display as a temperature indicia 156. A relay 160 and a relay switch 162 may also be used. This is effective for low power signals, as the display portion 118 is apt to use. Since the display portion 118 is in operational connection with a DC power source, such as the AC/DC adapter 134, a power twelve volt DC 164 may also be used for coupling to the AC/DC adapter 134.

Figure 8A:
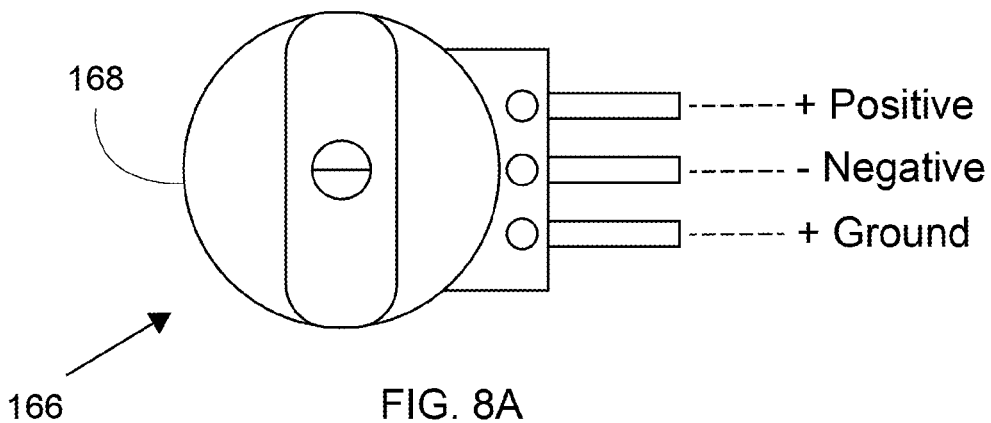
FIGS. 8A, 8B, and 8C illustrate various views of an exemplary variable switch potentiometer, where
Figure 8B:
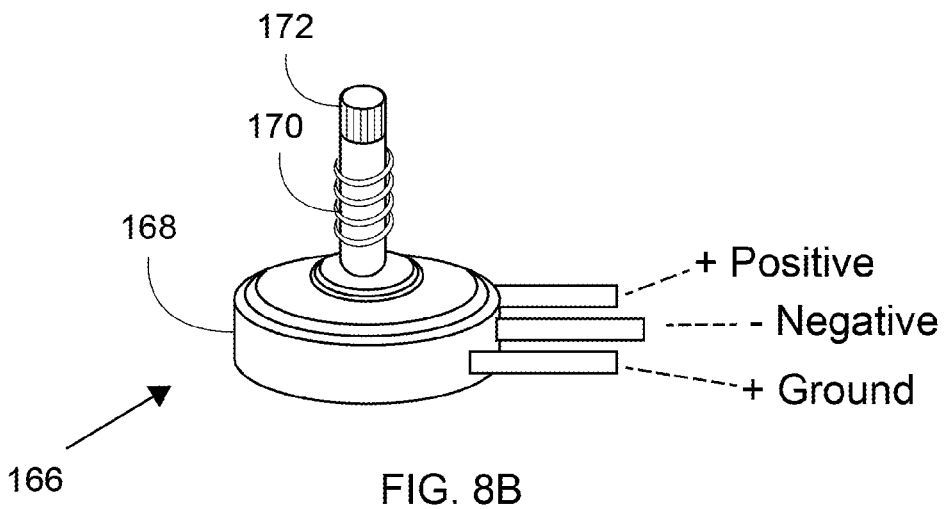
Figure 8C:
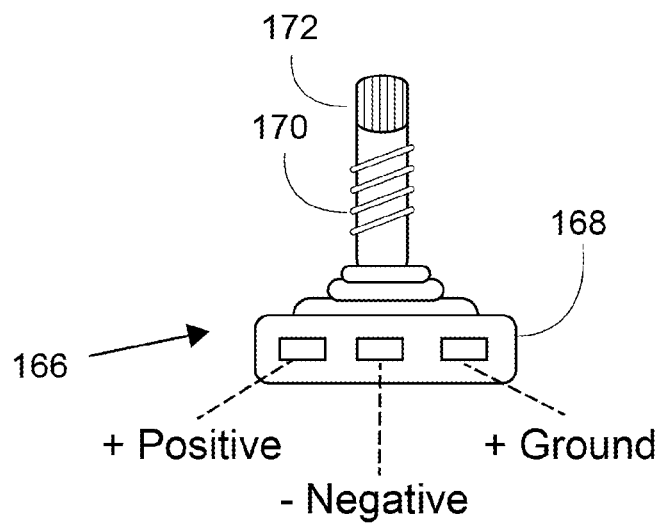

Turning now to FIGS. 8A, 8B, and 8C, a variable switch potentiometer 166 regulates the rotational velocity of the fan 110. The variable switch potentiometer 166 serves as a voltage divider that measures voltage running through the display portion 118 and the fan motor 112 and a thermostat that regulates the temperature of the air flow. The variable switch potentiometer 166 is used to gradually increase or decrease the voltage to the fan motor 112. The variable switch potentiometer 166 may include a potentiometer base 168 having a positive lead, a negative lead, and a neutral lead that extend therefrom. A threaded screw 170 extends from the potentiometer base 168. The threaded screw 170 enables rotational adjustment of the voltage. A cap threading 172 at the terminal end of the threaded screw 170 enables the variable switch potentiometer 166 to rotatably couple to the fan motor 112 or other electrical components.

Figure 9A:
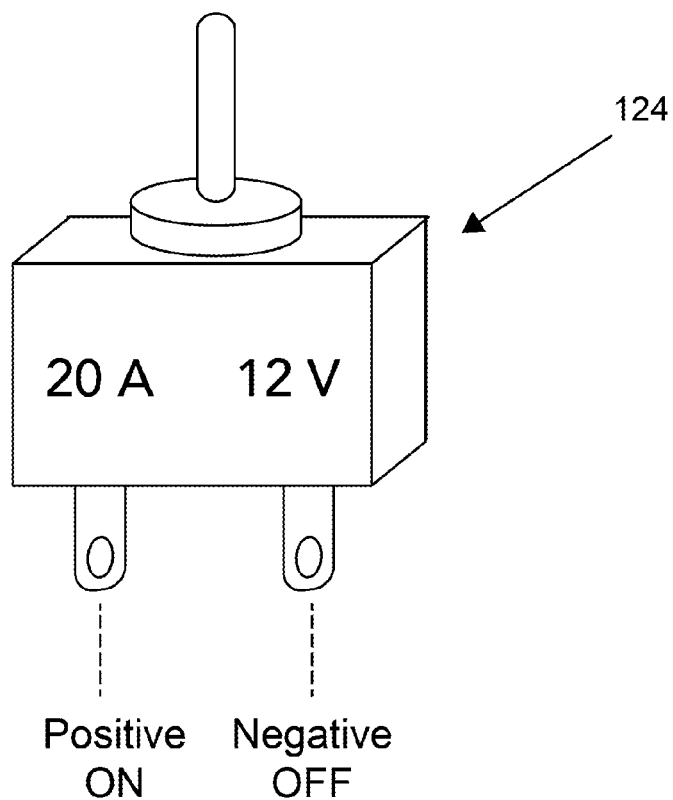
FIGS. 9A and 9B illustrate various views of an exemplary power toggle switch, where
Figure 9B:
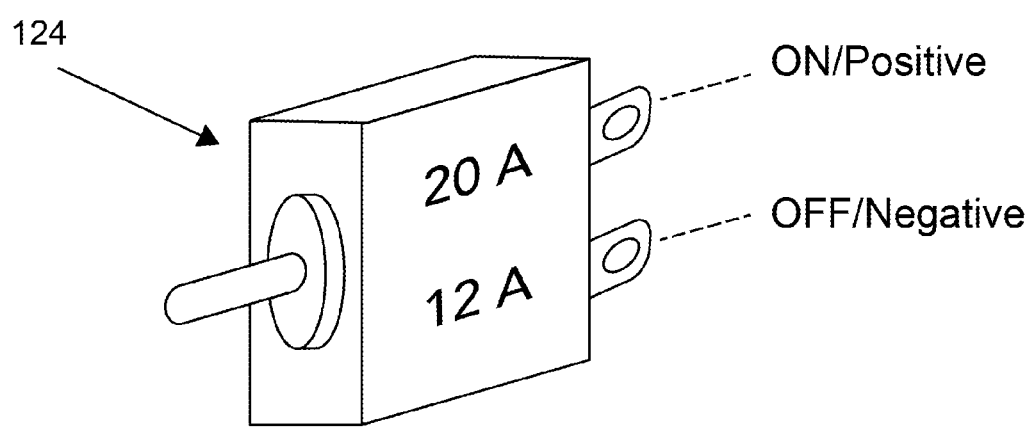

FIGS. 9A and 9B show a power toggle switch 124 for powering on and off the fan motor 112 and display portion 118. The power toggle switch 124 relies on a positive circuit to switch to an on position, and a negative circuit to switch to an off position. However in other embodiments, any number of power control switches, buttons, and relays may be used to regulate the fan motor 112 and the temperature of the device 100.

In one embodiment, the device 100 includes a generally cylindrical housing 102 made of carbon fiber material and has a 5" cylindrical intake and output openings 104,132. The housing 102 is corrosion resistant with a sealed motor shaft for moisture protection. The housing 102 magnetically attaches to an inlet air register opening of any offset smoker 200 using five neodymium magnets. The housing 102 contains a 3" or 4" speed forced draft fan 110 with a rheostat variable speed controller and digital temperature controller built in to assist in controlling the temperature in the cooking area. The fan 110 may be located 1" from the rear of the housing 102 and generates 50 to 130 cfms of air flow. A thin metal perforated stabilizing plate 128 in the output end 106 of the housing 102 helps to distribute the air flow evenly. The device 100 can be AC or DC powered using 8 AA rechargeable batteries for an internal power source. However, other variations of the device 100 are possible.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A negative draft inducing device for creating a negative draft through a smoker, the negative draft inducing device comprising:

a housing configured to attach to a lower portion of a smoker, the housing comprising an intake end and an output end, wherein the intake end and the output end are on opposite sides of the housing and open in a horizontal direction; the housing being closed on all sides other than the intake end and the output end; wherein the housing includes a handle attached to a top surface;

the intake end comprising an intake opening configured to enable an air flow into the housing, the output end comprising at least one aluminum plate for positioning at least one magnetic fastener, wherein the at least one magnetic fastener comprises at east one samarium cobalt magnet, an output opening configured to enable the air flow out of the housing and into the lower portion of the smoker, the output end further comprising the at least one magnetic fastener configured to fasten the housing to an air register in the lower portion of the smoker at a smoker intake end; and a fan enclosed on all four sides parallel to the axis of the fan by the housing, the fan configured to force the air flow from the intake end to the output end, wherein the air flow is induced within the smoker from the smoker intake end to a smoker output end creates a negative draft from the lower portion to an upper portion of the smoker and regulates a temperature within the smoker;

a variable switch potentiometer for regulating a rotational velocity of the fan; the variable switch potentiometer serves as a voltage divider that measures a voltage running through a display portion, a fan motor, and a thermostat that regulates the air flow; the variable switch potentiometer being used to adjust the voltage to the fan motor; the variable switch potentiometer includes a potentiometer base having a positive lead, a negative lead, and a neutral lead that extend therefrom.

2. The device of claim 1, wherein the housing comprises a generally cylindrical shape.

3. The device of claim 2, wherein the housing is waterproof.

4. The device of claim 3, wherein the output opening is a 5 inch cylindrical opening.

5. The device of claim 4, wherein the at least one magnetic fastener comprises ten samarium cobalt magnets.

6. The device of claim 1, wherein the aluminum plate comprises ten inserts for receiving the at least one magnetic fastener.

7. The device of claim 6, wherein the fan comprises a 3 inch circumference that forces the air flow at 130 cubic feet per minute.

8. The device of claim 7, wherein the device comprises an AC/DC adapter configured to receive AC electrical power or DC electrical power from a power source for operating the fan motor.

9. The device of claim 8, wherein the device comprises a rechargeable battery compatible with AC current; wherein the rechargeable battery is capable of being used for supplying power while plugged into an outlet.

10. The device of claim 9, wherein the rechargeable battery is in a DC power supply chamber.

11. The device of claim 1, wherein the display portion comprises an alarm relay output indicator, a value increment switch, an auto tuning switch, a set/confirm/control/start switch, an auto tuning blinker, and displays the temperature within the smoker.

12. The device of claim 11, further comprising a toggle power switch for actuating the fan motor.

* * * * *